United States Patent
Higbie

(10) Patent No.: US 6,735,427 B2
(45) Date of Patent: May 11, 2004

(54) INTEGRATED ADAPTIVE ANTENNA ARRAY AND ADAPTIVE LOCALLY-OPTIMUM DETECTION SYSTEM

(75) Inventor: James H. Higbie, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/381,727

(22) PCT Filed: Dec. 19, 2001

(86) PCT No.: PCT/US01/49262
§ 371 (c)(1),
(2), (4) Date: Mar. 27, 2003

(87) PCT Pub. No.: WO02/51028
PCT Pub. Date: Jun. 27, 2002

(65) Prior Publication Data
US 2003/0190933 A1 Oct. 9, 2003

Related U.S. Application Data
(60) Provisional application No. 60/256,539, filed on Dec. 19, 2000.

(51) Int. Cl.⁷ ............................. H04B 1/06; H04B 7/00
(52) U.S. Cl. .................... 455/278.1; 455/273; 455/283; 455/562.1
(58) Field of Search .............................. 455/561, 562.1, 455/269, 272, 273, 276.1, 277.1, 277.2, 278.1, 283, 280

(56) References Cited

U.S. PATENT DOCUMENTS

| | | | | |
|---|---|---|---|---|
| 5,018,088 A | * | 5/1991 | Higbie | 702/194 |
| 5,425,059 A | * | 6/1995 | Tsujimoto | 375/347 |
| 5,517,531 A | * | 5/1996 | Bond et al. | 375/350 |
| 5,550,759 A | * | 8/1996 | Bond et al. | 702/199 |
| 5,592,490 A | * | 1/1997 | Barratt et al. | 370/310 |
| 5,933,446 A | * | 8/1999 | Bond et al. | 375/130 |
| 6,564,044 B1 | * | 5/2003 | Rilling | 455/277.1 |
| 2002/0013164 A1 | * | 1/2002 | Leifer et al. | 455/562 |

OTHER PUBLICATIONS

"Adaptive Nonlinear Suppression of Interference," in Proceedings of MILCOM 88, IEEE, New York, p. 23.3.1, 1988 by J.H. Higbie.

(List continued on next page.)

Primary Examiner—Edward F. Urban
Assistant Examiner—Duy K Le
(74) Attorney, Agent, or Firm—Francis A. Cooch

(57) ABSTRACT

A system is provided which combines the advantages of Adaptive Antenna Arraying and Adaptive Locally-Optimum Detection, as well as Adaptive Filtering, signal processing techniques and achieves the capabilities of all these techniques. The present invention represents the first successful integrated system for performing signal processing techniques associated with an Adaptive Antenna Array (AAA) system and an Adaptive Locally-Optimum Detection (ALOD) system. The system automatically distributes interference signals among Adaptive Antenna Arraying and Adaptive Locally-Optimum Detection sub-systems according to which sub-system's algorithms can provide a more optimum suppression of the interference signals. The system permits an adaptive antenna array with a given number of antenna elements to effectively suppress a larger number of interferers than it otherwise could, and to adapt more quickly to a rapidly changing interference scenario. For an adaptive antenna array with a small number of antenna elements, e.g., two to four, the system provides added interference suppression capability than could be done by adding antenna elements to the adaptive antenna array. The system is primarily designed for incorporation within systems using Direct Sequence Spread Spectrum signals, such as Global Positioning System (GPS) signals. In a preferred embodiment the inventive system is incorporated within a conventional GPS receiver which tends to be vulnerable to jamming by interference signals.

19 Claims, 5 Drawing Sheets

OTHER PUBLICATIONS

"Beamforming Using Adaptive Locally Optimum Performance Indicators" by Hank Schmidt and James W. Bond, 1994 IEE.

"Evaluating Transform Estimators for Locally Optimum Signal Processors," Unclassified paper in Classified Proceedings of MILCOM 92, IEEE, New York, p. 162, 1993 by S.T. Radcliffe and J.H. Higbie.

"High Speed Nonlinear Adaptive Processor," Proceedings of MILCOM 96, IEEE, New York, p. 328, 1996.

"Combined Narrowband Frequency Excision and Nonlinear Zero–Memory Processor", Unclassified paper in Classified Proceedings of MILCOM 92, IEEE, New York, p. 156, 1993.

* cited by examiner

INTEGRATED ADAPTIVE ANTENNA ARRAY AND ADAPTIVE LOCALLY-OPTIMUM DETECTION SYSTEM

CROSS REFERENCE TO RELATED APPLICATIONS

This application is related to and claims the benefit of U.S. Provisional Patent Application entitled, "Integrated Adaptive Antenna Array and Adaptive Locally-Optimum Detection System", Serial No. 60/256,539, filed Dec. 19, 2000.

BACKGROUND OF THE INVENTION

1. Field of the Invention

The present invention relates to signal acquisition and processing. In particular, the present invention relates to a system that combines Adaptive Antenna Arraying and Adaptive Locally-Optimum Detection signal processing techniques and achieves the capabilities of both techniques. The system automatically distributes interference signals among Adaptive Antenna Arraying and Adaptive Locally-Optimum Detection sub-systems according to which sub-system's algorithms can provide a more optimum suppression of the interference signals. The present invention also relates to a system that combines Adaptive Filtering and Adaptive Locally-Optimum Detection signal processing techniques and achieves the capabilities of both techniques. The present invention also relates to a system that combines Adaptive Filtering, Adaptive Antenna Arraying and Adaptive Locally-Optimum Detection signal processing techniques and achieves the capabilities of all three techniques. The system is primarily designed for incorporation within systems using Direct Sequence Spread Spectrum signals, such as Global Positioning System (GPS) signals. In a preferred embodiment the inventive system is incorporated within a conventional GPS receiver, which tends to be vulnerable to jamming by interference signals.

2. Description of the Related Art

Adaptive Filtering, Adaptive Antenna Arraying and Adaptive Locally-Optimum Detection are three complementary signal processing techniques used by an Adaptive Filter (AF) system, an Adaptive Antenna Array (AAA) system and an Adaptive Locally-Optimum Detector (ALOD) system, respectively, for detecting weak signals (such as radio and radar) in the presence of strong man-made interference or jamming signals.

Each one of these techniques has its own limitations. An AF, such as Frequency Excision (FX) or Adaptive Wiener Filtering (AWF), can be effective against a large number of narrowband jammers, but its performance declines with interference bandwidth. An AF is ineffective against full-band jammers. An AAA, such as a Controlled Radiation Pattern Antenna (CRPA), is effective against all types of jamming, but requires an array of multiple antenna elements. An ALOD, such as Nonlinear Adaptive Processor (NONAP) technology developed by The Johns Hopkins University/Applied Physics Lab (JHU/APL), achieves gain against all power-efficient (and therefore non-Gaussian) types of jamming and requires relatively little processing power, but produces little gain when confronted with nearly Gaussian interference, such as more than two or three simultaneous independent jammers of comparable power.

The AAA system suppresses interference signals based on their direction of arrival or polarization. A conventional prior-art AAA system accomplishes this by weighting the signal from each antenna element and summing them together to form an output. For applications where the signal of interest is weaker than the antenna noise so that any detectable signal above the antenna noise is interference and should be suppressed, the output may be used as an error feedback signal to drive the AAA weights towards the values that minimize the output and therefore suppress the interference contribution to the output. Such a prior-art AAA system configuration is shown by FIG. 1.

For appropriate applications, a conventional prior-art AAA system can incorporate "beam-forming" capability, i.e. the ability to protect a known direction of arrival from which the signal of interest is expected so that the AAA will not form a null in that direction. For example, a conventional Griffiths-Jim beamforming pre-processor (as described in Griffiths, L. J., and Jim, C. W., "An Alternative Approach to Linearly Constrained Adaptive Beamforming," IEEE Trans. Antennas Propag., vol. AP-30, pp. 27–34, (January 1982)) can simply be inserted just in front of the AAA system as shown by FIG. 2. The Griffiths Jim pre-processor first weights the signal from each of the M elements, X, so that if summed together without further weighting they would steer the array in the direction of the desired signal. The Griffiths-Jim reference output component is taken to be that unweighted sum of the steered input components, and the M-1 Griffiths-Jim auxiliary components are simply the differences between independent pairs of the steered elements of X.

Since a standard AAA system can only suppress M-1 spatially distinct interferers, where M is the number of antenna elements, prior art includes augmenting an AAA system with an AF system. Adding the AF component increases the number of simultaneous sources of interference that may be countered if some of these sources are narrow-band.

An AF system can improve the performance of an AAA system in another way: If, as is usual, the AAA weights are simple multipliers that shift signal phase but don't alter the time delay, then the ability of the AAA system to cancel interference declines as interference bandwidth increases, or if signal echoes, such as may be caused by multi-path propagation, are present. Under such conditions, an AF system can improve antijam (AJ) gain by altering the effective time delay of signals from a given element, or even by suppressing echoes.

A conventional prior-art means of combining AF and AAA techniques is to filter the M signals from the antenna elements with M separate filters prior to applying these signals to the AAA system. As with the AAA system, the output of the AAA system is used as an error feedback signal, but in the AF-AAA system this error signal is used to update not only the AAA weights, but also a set of filter weights (one for each filter "tap" or degree of freedom) for each filter. Such a prior-art AF-AAA system, sometimes referred to as a Space-Time Adaptive Processor (STAP), is shown by FIG. 3.

An amplitude-domain ALOD, such as described in (1) Higbie, J. H., "Adaptive Nonlinear Suppression of Interference," in Proc. MILCOM 88, IEEE, New York, p. 23.3.1 (1988); (2) Higbie, J. H., "Adaptive Locally-Optimum Detection Signal Processor and Processing Methods," U.S. Pat. No. 5,018,088, issued May 21, 1991; and (3) Radcliffe, S. T., and Higbie, J. H., "Evaluating Transform Estimators for Locally Optimum Signal Processors," Unclassified paper in Classified Proc. MILCOM 92, IEEE, New York, p. 162 (1993), enables suppression of non-Gaussian interference sources (i.e. ones whose amplitudes do not follow a Rayleigh probability distribution). This class includes all man-made interference sources, such as jamming. An ALOD is especially attractive in an AJ system because it can suppress wide-band jamming, unlike an AF, and doesn't require multiple antenna elements, as does an AAA. Another advantage of an ALOD implemented as described in References 1–3 is that its adaptation is rapid, so that it can combat even rapidly time-varying jamming, which is difficult for conventional AAA or AF signal processing designs that are based on using error feedback to update weights.

From the perspective of the jammer, it is possible to design jamming waveforms against which an ALOD system does not provide usable antijam (AJ) gain, however transmitting such waveforms nearly always requires a reduction in the power that can be devoted to jamming the victim receiver. The jamming power must be reduced either by spreading its energy outside the frequency band occupied by the victim signal, or by modulating the amplitude of the jamming waveform. (Amplitude modulation reduces the average jamming power relative to the peak jamming power. Since the jammer's peak power is typically fixed, amplitude modulation causes an absolute reduction in the average jamming power, which reduces jamming impact.)

It is advantageous to augment an ALOD system with an AF system, in order to increase the number of simultaneous independent jammers that may be countered. An effective prior-art AF-ALOD system configuration is to feed the (single-element) input signal to the AF system and to feed the output from the AF system to the ALOD system. No feedback path is required.

As mentioned in (4) Brunson, S. J., "Combined Narrow-band Frequency Excision and Nonlinear Zero-Memory Processor," Unclassified paper in Classified Proc. MILCOM 92, IEEE, New York, p. 156 (1993), when a wide-band jamming signal, such as may effectively be suppressed by an ALOD system, is filtered, amplitude fluctuations are introduced that reduce the antijam (AJ) gain achievable by the ALOD system. An effective integration of AF and ALOD techniques therefore requires that the AF system be designed to minimize the reduction in ALOD AJ gain.

As also mentioned in Reference 4, an effective prior art-approach for designing an AF system as a pre-processor for an ALOD system is to restrict filtering so that the AF system only removes very narrow frequency slices when wideband jamming is present, and always preserves the phase relationships of the various frequencies. An AF system operating in the frequency domain, typically called a Frequency Excision (FX) system, can do this if appropriately designed. However, conventional prior-art AF systems have been designed to operate alone or as AAA pre-processors and do not perform effectively as ALOD or AAA-ALOD pre-processors. In particular, they do not suppress amplitude fluctuations in the AF output that goes to the ALOD, and can even make such amplitude fluctuations larger, thereby preventing the ALOD from achieving significant AJ gain.

Attempts have been made in the past to combine the advantages of both AAA and ALOD systems. For example, H. Schmidt and J. W. Bond investigated a two-element electrically-small antenna array followed by a separate locally-optimum detector (See IEEE MILCOM94 Proceedings, page 11–2.1 to 3, October 1994). However, Schmidt and Bond were unable to solve the general adaptation problem, i.e., to have their system adapt quickly to a rapidly changing interference scenario, except through a brute force approach that required excessive computation; Schmidt and Bond designed a sub-optimum approach for determining weights of the antenna array which would produce the desired result under certain restricted interference scenarios.

A need therefore exists for a system that solves the general adaptation problem and is able to integrate or combine the jamming suppression capabilities of signal processing techniques associated with AAA and ALOD systems according to the characteristics of the incoming interference signals. A need also exists for a system that is able to effectively combine the jamming suppression capabilities of AF signal processing techniques with those of ALOD systems, according to the characteristics of the incoming interference signals. A need also exists for a system that is able to combine the jamming suppression capabilities of AF signal processing techniques with those of AAA and ALOD systems, according to the characteristics of the incoming interference signals.

Further, a need also exists for a system that is computationally simple; converges towards an optimum solution for arbitrary interference scenarios; and can be used with an antenna array having an arbitrary number of antenna elements.

SUMMARY OF THE INVENTION

The present invention provides a system that combines the advantages of Adaptive Antenna Arraying and Adaptive Locally-Optimum Detection, as well as Adaptive Filtering, signal processing techniques and achieves the capabilities of all these techniques. The present invention represents the first successful integrated system for performing signal processing techniques associated with an Adaptive Antenna Array (AAA) system and an Adaptive Locally-Optimum Detection (ALOD) system. The system automatically distributes interference signals among Adaptive Filtering, Adaptive Antenna Arraying and Adaptive Locally-Optimum Detection sub-systems according to which sub-system's algorithms can provide a more optimum suppression of the interference signals.

Applications with the most to gain from adding an ALOD system to an AAA system are those that, owing to platform size restrictions, cannot support an antenna system with many elements. A typical AAA system of interest might have only two to four antenna elements, for which the addition of an ALOD system can enable a substantial increase in jam-resistance.

The inventive system permits an adaptive antenna array with a given number of antenna elements to effectively suppress a larger number of interferers, and to adapt more quickly to a rapidly changing interference scenario. For an adaptive antenna array with a small number of antenna elements, the inventive system can provide added interference suppression capability with less increase in size, weight, power draw or cost than could be achieved by adding antenna elements to the adaptive antenna array.

The system is primarily designed for incorporation within systems using Direct Sequence Spread Spectrum signals, such as Global Positioning System (GPS) signals. The system is also appropriate for incorporation within systems using hybrid Direct Sequence and Frequency-Hopped Spread Spectrum signals, such as military antijam (AJ) radio signals. In a preferred embodiment the inventive system is incorporated within a conventional GPS receiver, which tends to be vulnerable to jamming by interference signals.

DESCRIPTION OF THE PREFERRED EMBODIMENTS

The present invention provides a system that combines the advantages of Adaptive Antenna Arraying and Adaptive Locally-Optimum Detection, as well as Adaptive Filtering, signal processing techniques and achieves the capabilities of all these techniques. The present invention represents the first successful integrated system for performing signal processing techniques associated with an Adaptive Antenna Array (AAA) system and an Adaptive Locally-Optimum Detection (ALOD) system. The system automatically distributes interference signals among Adaptive Antenna Arraying and Adaptive Locally-Optimum Detection sub-systems according to which sub-system's algorithms can provide a more optimum suppression of the interference signals. For applications with a single antenna element, the present invention also provides an improved system for combining the advantages of an Adaptive Filter (AF) system and an ALOD system and achieving the capabilities of both these techniques.

The inventive system permits an adaptive antenna array with a given number of antenna elements to effectively suppress a larger number of interferers than it otherwise could, and to adapt more quickly to a rapidly changing interference scenario. For an adaptive antenna array with a small number of antenna elements, e.g., two to four, the inventive system provides a significant increase in interference suppression capability.

The system is primarily designed for incorporation within systems using Direct Sequence Spread Spectrum signals, such as Global Positioning System (GPS) signals. In a preferred embodiment the inventive system is incorporated within a conventional GPS receiver, which tends to be vulnerable to jamming by interference signals. The system is also appropriate for incorporation within systems using hybrid Direct Sequence and Frequency-Hopped Spread Spectrum signals, such as military AJ radio signals.

Figure 1:
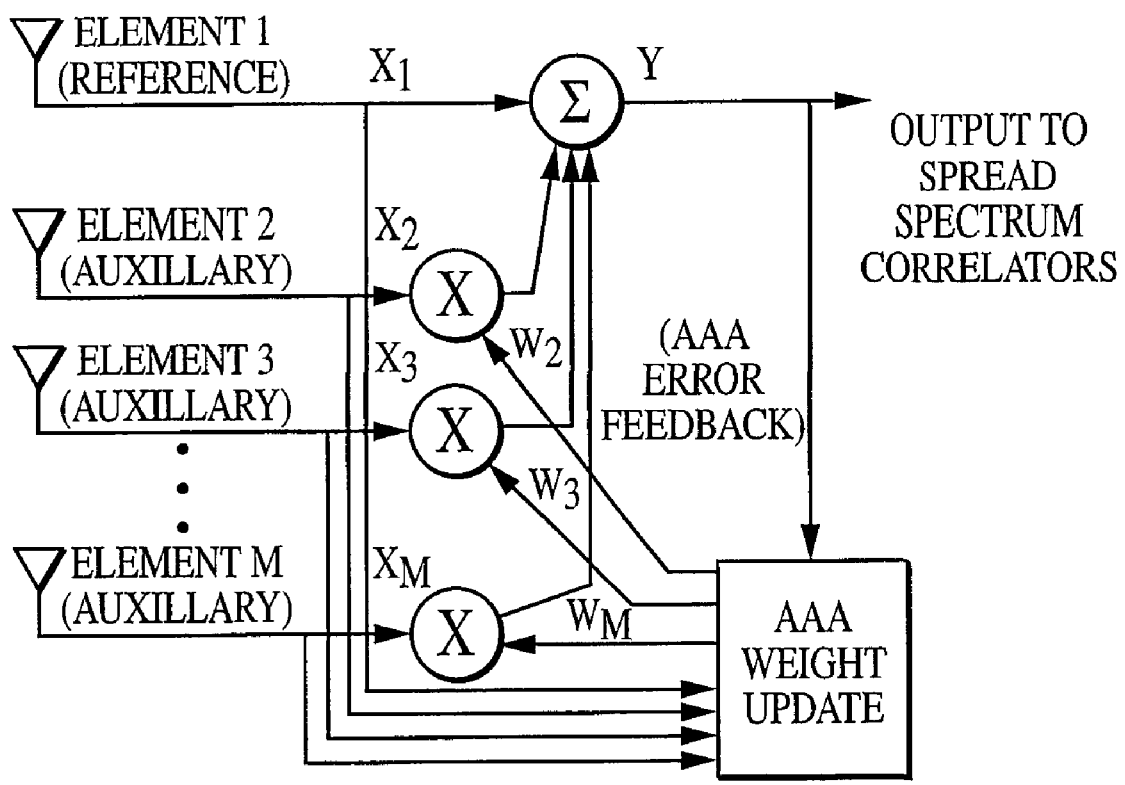
FIG. 1 is a signal/data flow diagram illustrating the architecture of a prior art Adaptive Antenna Array (AAA) system.

The technical approach for realizing the inventive AAA-ALOD system will now be described. It is most easily understood with reference to a conventional prior-art AAA system, such as that shown in FIG. 1. A typical AAA system design employs a least-mean-squares (LMS) adaptive null-steering algorithm, and use the output as an error signal to adapt antenna steering weights so as to minimize output power. In the inventive system (shown by FIG. 4), an AAA system output feeds an ALOD system and an ALOD system output (from which the ALOD system has suppressed the jammers it is most effective against) is used as the error signal to drive an AAA null-steering weight adaptation system. With this structure, the AAA system avoids expending its degrees of freedom on constant-amplitude or other jammers that can be effectively suppressed by the ALOD system (References (1)–(3)), while the ALOD system benefits from having the AAA system screen out as many jammers as possible from its input. Thus, the inventive AAA-ALOD system may counter a greater number of simultaneous jammers than can the AAA system by itself.

Figure 4:
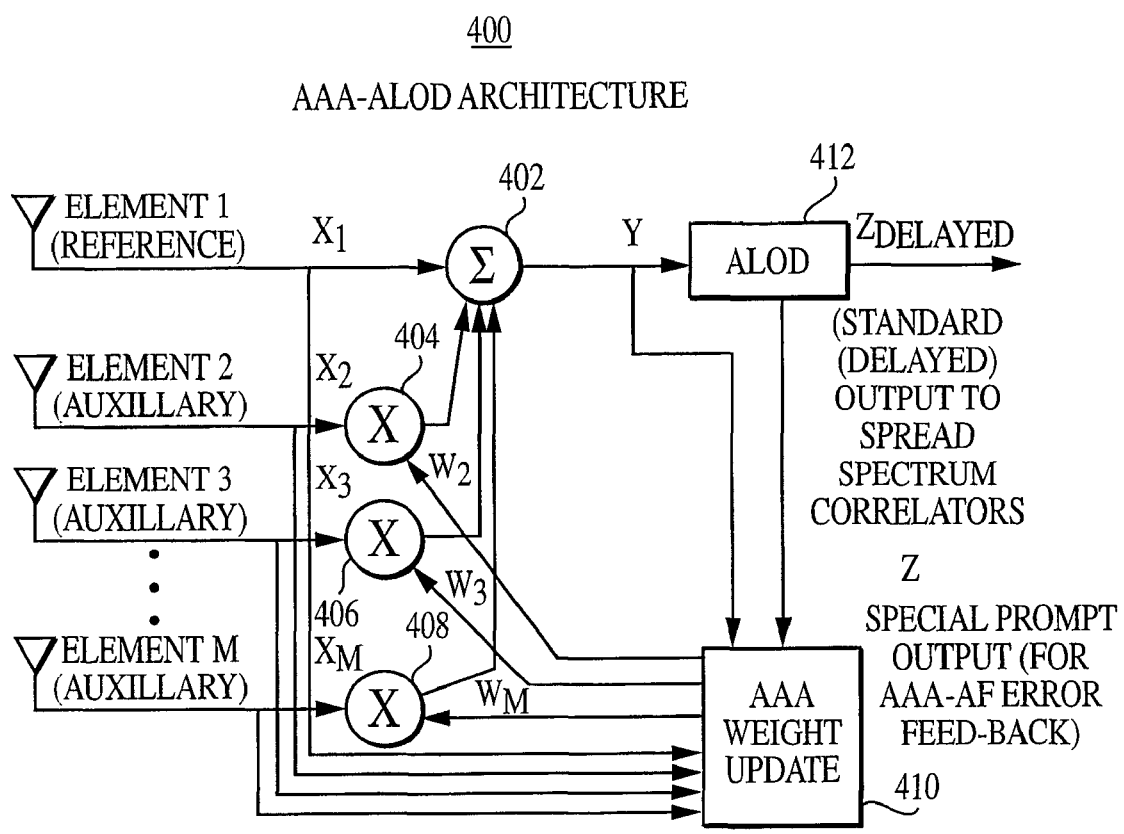
FIG. 4 is a signal/data flow diagram illustrating the architecture of an Adaptive Antenna Array-Adaptive Locally-Optimum Detection (AAA-ALOD) system in accordance with the present invention.
Figure 5:
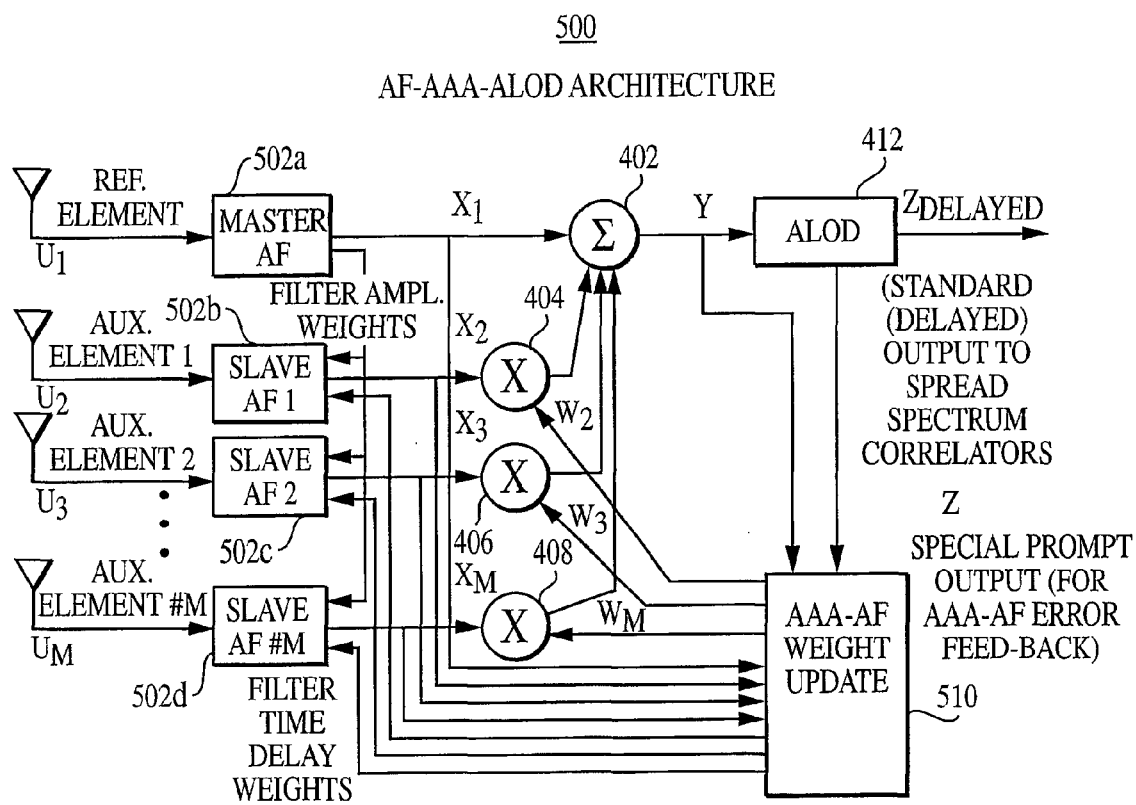
FIG. 5 is a signal/data flow diagram illustrating the architecture of a combined Adaptive Filter, Adaptive Antenna Array and Adaptive Locally-Optimum Detection (AF-AAA-ALOD) system in accordance with the present invention.

The inventive AAA-ALOD system shown by FIG. 4 can be augmented with an AF to further increase the number of simultaneous jammers that may be countered. Such an inventive AF-AAA-ALOD system is shown in FIG. 5. For applications with a single antenna element, an AF system may similarly be used as part of a simple AF-ALOD system. As mentioned in Reference (4), when a wide-band jamming signal such as may effectively be suppressed by an ALOD system is filtered, amplitude fluctuations are introduced that reduce the antijam (AJ) gain achievable by the ALOD system. An effective integration of AF and ALOD techniques therefore requires that the AF system be designed to minimize the reduction in ALOD AJ gain.

The invention includes an improved approach for designing an AF system as an effective pre-processor for an ALOD system. As with prior-art approaches, the AF system operates in the frequency domain and includes an FX function.

Unlike prior-art AF systems, the inventive AF system combines a Frequency Excisor with a frequency-domain Adaptive Wiener Filter (AWF). For applications with the desired signal buried in white Gaussian noise, such as GPS, the frequency-domain AWF simply replaces the amplitude at each frequency with an amplitude roughly proportional to its inverse (taking into account the effect of the receiver's band filtering). Within the FX-AWF system, the input signal is first transformed to the frequency domain, and then fed to the FX system. The output of the FX system is fed to the AWE, if indicated, and the AWF output (or FX output, if the AWF is disabled) is transformed back to the time domain.

In order to limit amplitude fluctuations that can be introduced by an AWF, the inventive AF only enables the AWF component when the input signal's power spectrum indicates that strong interference, if present, does not occupy more than a given fraction of the desired signal bandwidth, e.g. 70%. When the AWE is enabled, the inventive AWE is designed to reduce amplitude fluctuations that it introduces by means of quantized attenuation coefficients. In the preferred AWF embodiment, the amplitude of every frequency component is replaced not by a value proportional to its exact inverse, but by a value that has been rounded to the nearest 6 dB.

Unlike prior-art AF systems, the inventive FX component of the AF is also designed to introduce as few additional amplitude fluctuations into wide-band signals in the output as possible. To this end it employs overlap-and-add combining of Fourier transform blocks together with appropriate windowing such that the summed window coefficients are constant for all samples in the output. For example, 50% overlap may be used with Hann windowing. Similarly, large Fourier block sizes are used (typically 512 or more points) so that excision of a narrow-band signal will not affect signal components at nearby frequencies.

Unlike prior-art FX systems, the FX component of the inventive AF system is carefully designed to minimize amplitude fluctuations due to multiple narrow-band signals in the output. To this end it employs aggressive but sophisticated identification of frequencies to be excised, based on frequency-dependent excision thresholds computed from the median level in a sliding frequency window. This enables detection and excision of narrow-band signals on the skirts of overlapping wide-band signals without excising the peaks of medium-band or wide-band signals.

Unlike prior-art AF systems, the inventive AF is also designed to provide aggressive but sophisticated identification of frequencies to be excised based on time averaging over multiple Fourier blocks of the power spectrum used to compute excision thresholds, using independent dynamic (data-dependent) time constants for every frequency bin. The dynamic time constants are designed to decrease at any frequency when the instantaneous spectral power at that frequency differs widely from the time-averaged spectral power and to increase when the instantaneous and average spectra agree. Dynamic time averaging enables detection of even weak narrow-band interference components without unduly sacrificing agile response to rapidly changing interference conditions.

For use in the AF-AAA-ALOD system, the inventive AF system described above may be configured such that a single set of frequencies to be excised or amplitude weights may be determined by one AF (the "master") and the signal from every other antenna element can then be subjected to the same filtering by "slave" AF units.

In addition to suppressing narrow-band interference, an AF system can improve the performance of an AAA-ALOD system in another way. If, as is usual, the AAA weights are simple multipliers that shift signal phase but do not alter the time delay, then the ability of the AAA system to cancel interference declines as interference bandwidth increases, or if signal echoes, such as may be caused by multi-path propagation, are present. Under such conditions, an AF system can improve AJ gain by altering the effective time delay of signals from a given element, or even by suppressing echoes. A frequency-domain AF system can implement time delays as frequency-proportional phase weights. For this AF function, the time delay information is different for each element, and each AF acts differently, unlike the excision/amplitude weight information for the FX-AWF filtering described above. Moreover, it requires that time-delay information from the AAA-ALOD system be fed back to each AF.

The system architecture for a combined AAA-ALOD system following the principles of the invention is shown by FIG. 4 and designated generally by reference numeral 400. The system 400 includes an antenna having multiple elements, a Reference Antenna Element and one or more Auxiliary Antenna Elements 2-M. The ALOD system incorporated within the inventive AAA-ALOD system is preferably the ALOD system described in U.S. Pat. No. 5,018,088 issued to Higbie, J. H. on May 21, 1991; the contents of which are incorporated herein by reference.

The input signal $X_1$ (a band limited signal with in-phase and quadrature components represented at each moment by the real and imaginary components of a complex number in this discussion) from the Reference Antenna Element is fed to a summation block 402. The input signals $X_2$–$X_M$ from the Auxiliary Antenna Elements 2-M are fed to weighting blocks 404, 406, and 408, respectively, where they are multiplied with corresponding complex weights $W_2$–$W_M$ provided by an AAA Weight Update block 410.

After the signals are multiplied by the corresponding weights $W_2$–$W_M$ to produce weighted signals, the weighted signals are provided to the summation block 402. At the summation block 402, the weighted signals are summed together with the input signal $X_1$ to produce an AAA output signal Y. The AAA output signal Y is fed to a ALOD processing block 412 which uses the AAA output signal Y to produce a system output signal $Z_{delayed}$, which is fed to the receiver's Spread Spectrum correlators, and a prompt ALOD output signal Z, which is fed to the AAA Weight Update block 410. The AAA output signal Y is also fed to the AAA Weight Update block 410. The system 400 uses the ALOD prompt output signal Z, the AAA output signal Y, signal $X_1$ inputted to the summation block 402, signals $X_2$–$X_M$ inputted to the weighting blocks 404, 406, and 408 for generating weights $W_2$–$W_M$ to drive the weighting blocks 404, 406, and 408.

The system architecture for a combined AF-AAA-ALOD system following the principles of the invention is shown by FIG. 5 and designated generally by reference numeral 500. The system 500 includes all of the AAA-ALOD system 400 except that the AAA-AF Weight Update block 510 replaces the AAA Weight Update block 410. In addition, the system 500 is augmented by the AF blocks 502a–502d. The AAA-AF Weight Update block 510 not only generates the weights $W_2$–$W_M$ to drive the weighting blocks 404, 406, and 408, but it also generates filter time delay weights to drive AF blocks 502a–d.

The filter time delay weights specify the time intervals by which the filters effectively delay the signals passing through them. It is provided that the weights could specify multiple delays and associated amplitudes for each filter block, and a filter would create echoes at each of the delay times with the appropriate corresponding amplitudes.

The system 500 also includes an Adaptive Filtering (AF) processing system. As shown by FIG. 5, the AF processing system includes the adaptive-filtering processors 502 a–d. In the preferred embodiment, the master AF processor 502a is designed according to the inventive FX-AWF principles described above. In the system 500, the AAA inputs from each antenna element are separately filtered.

In the preferred embodiment, the slave AF processors 502b through 502d perform the same frequency-domain filtering processes as does the master AF processor 502a, namely excision, attenuation and, optionally, time-delay. The slave AF processors 502b through 502d do not perform any of the adaptive processes used by the master AF processor to determine which frequencies are to be excised or attenuated. Instead, the master FX processing block 502a determines which frequencies are to be excised or attenuated, and if attenuated, by how much. Upon making the determination, the master FX processing block 502a sends these filter amplitude weights to the slave FX processing blocks 502b–d which then carry out the requested excision and attenuation operations.

Then, both the master and slave FX processing blocks 502a–d all excise/attenuate the input signals U1–UM identically, before the excised/attenuated input signal $X_1$ is sent to the summation block 402 and the frequency excised/attenuated input signals $X_2$–$X_M$ are sent to the weighting blocks 404, 406, and 408. The process then proceeds as described for the system 400.

A description will now be provided of the weight update algorithm utilized by the Weight Update block 410 or 510 to update the weights for the AAA weighting blocks 404, 406, and 408.

The weights for the AAA are updated in a manner similar to that used in a conventional LMS-based AAA, with a new form for the complex weight update, $\vec{dW}$. (Throughout, electrical signals will be represented, as is conventional, by complex numbers or "phasors" whose real and imaginary parts correspond to their band-limited base-band in-phase and quadrature components. Similarly weights are represented by complex numbers that act on signals by complex multiplication. Such phasors are indicated by variables in boldface. Sets of signals or weights for each of the M elements of the antenna array are represented by vectors and indicated by variables with arrows over them. Time averages are indicated by variables with bars over them.)

For applications where the signal of interest is weaker than the antenna noise so that any detectable signal above the antenna noise is interference and should be suppressed, conventional prior-art LMS weight adaptation is defined by:

$$\vec{dW} = \mu \cdot \vec{dW_0}, \quad (1)$$

where $\vec{dW_0} = 2 \cdot (\text{err}^* \cdot \vec{X})$ (2)

$$\text{err} = -Y \quad (3)$$

$\vec{X} \equiv AAA$ vector input (1 phasor for each of $M$ antenna elements), (4)

$Y \equiv AAA$ phasor output = ALOD input. (5)

For applications where the signal of interest is weaker than the antenna noise, conventional prior-art amplitude-domain ALOD processing of an input signal, Y, to create an output signal, Z, is defined by:

$$Z = -\frac{1}{2}\frac{Y}{|Y|}\frac{\frac{\partial}{\partial |Y|}\left\{\frac{p(|Y|)}{|Y|}\right\}}{\left\{\frac{p(|Y|)}{|Y|}\right\}}, \quad (6)$$

where p(|Y|) is an estimate of the probability density function of the input signal's amplitude, |Y|. Note that Z has dimensions of $Y^{-1}$.

To operate with an ALOD, the AAA weight update algorithm needs to use the ALOD output signal to replace, at least partially, the AAA output signal as an error feedback signal. In the preferred embodiment, equations (2) and (3) are modified to:

$$\vec{dW_0} = \frac{1}{\text{Gain}_{AAA+ALOD}} \cdot \frac{(\text{err}^* \cdot \vec{X})}{|\text{err}| \cdot \left(\frac{X_{\text{rms}}}{M}\right)}, \quad (7)$$

$$\text{err} \equiv Y - (1+\alpha_{stab}) \cdot (Z \cdot Y_{rms}^2), \quad (8)$$

where $Z \equiv$ ALOD prompt phasor output, (9)

$\text{Gain}_{AAA+ALOD} = X_{rms} \cdot Z_{rms}.$ (10)

The variables $X_{rms}$, $Y_{rms}$, $Z_{rms}$ indicate time averaged magnitudes of the corresponding phasors. These time averages must be relatively stable from sample to sample, but to be updated whenever conditions are changing. For example they can be implemented with a sliding window or recursive filter with a time constant in the range 100 to 1000 samples.

The stabilization constant, $\alpha_{stab}$, must be positive to avoid instability (weights grow uncontrollably with time), but should not be so large that weights require too long to converge to their desired values. A value of $\alpha_{stab}=0.2$ has been found to work for some applications.

In a conventional prior-art ALOD system, the output samples, Z, are delayed relative to the corresponding input sample, Y, in order to acquire enough future samples of |Y| to estimate its current probability density function. Because the AAA weight update algorithm in the inventive system will be slowed down in proportion to the delay of the error feedback signal, it is advantageous to design the ALOD in the inventive system to provide a "prompt" error feedback signal with minimum delay. This is done by estimating P(|Y|) using only past samples of |Y|.

Another measure to improve weight convergence behavior is to replace the conventional convergence speed parameter, $\mu$, with a dynamic variable that adapts according to the average speed of weight change. In the preferred embodiment, $\mu$ is raised or lowered depending on dU being greater or less than 0.1, where dU measures the average weight convergence:

$$dU \equiv \frac{\overline{(\vec{dW_0})}^T \cdot \overline{(\vec{dW_0})}}{\overline{(\vec{dW_0})^T \cdot \vec{dW_0}}} \cdot \tau, \quad (11)$$

and where $\tau$ is the time constant for the averaging indicated in equation (11) by the over-bar, e.g. at time (k+1), the average weight update in equation (11) is computed as:

$$\overline{\vec{dW_0}(k+1)} \equiv \overline{\vec{dW_0}(k)} + \frac{\left(\vec{dW_0}(k+1) - \overline{\vec{dW_0}(k)}\right)}{\tau}. \quad (11)$$

A value of $\tau \sim 2000$ has been found to be acceptable in some applications. In the preferred embodiment, $\mu$ is multiplied by ~1.001 or 0.999 depending on dU being greater or less than 0.1, within the limits 0.03 to 15.

The filter time delay weights generated by the AAA-AF Weight Update block 510 may be computed by one skilled in the art using the same weight update equations (4) through (11), where additional components are computed by introducing delayed components X(k-1), X(k-2), etc. in place of X in equation (7).

Figure 2:
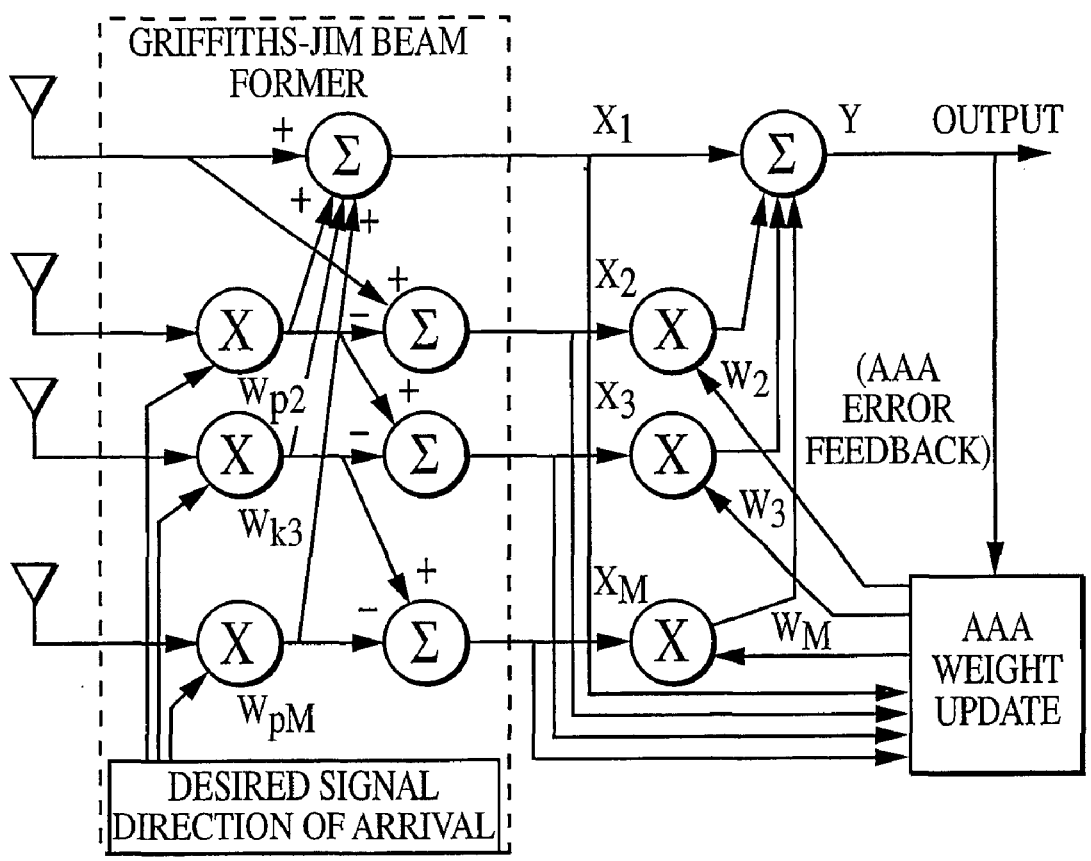
FIG. 2 is a signal/data flow diagram illustrating the architecture of a prior art Adaptive Antenna Array (AAA) system with beamforming.
Figure 3:
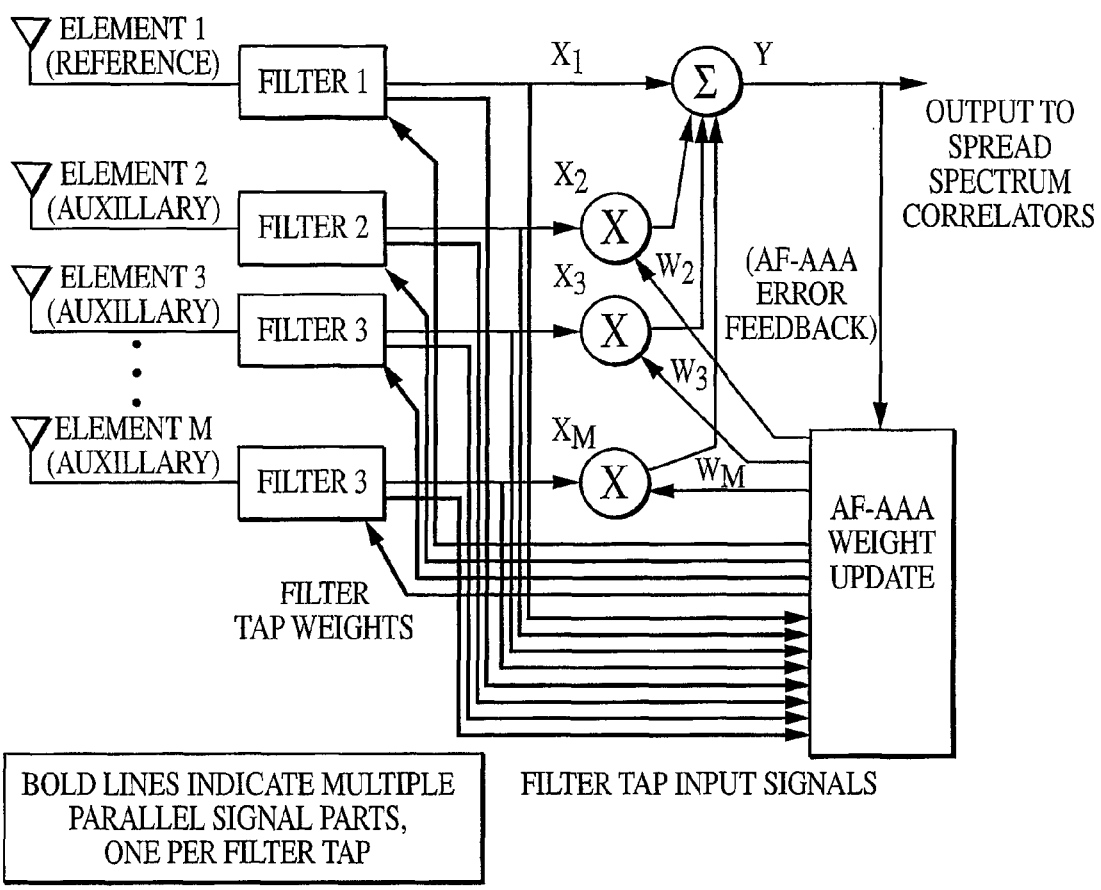
FIG. 3 is a signal/data flow diagram illustrating the architecture of a prior art Adaptive Filter-Adaptive Antenna Array (AF-AAA) system.

For appropriate applications, the AAA-ALOD system can incorporate "beam-forming" capability in exactly the same way as the prior art AAA system with beamforming shown by FIG. 2. For example, a conventional Griffiths-Jim beam-forming pre-processor, such as that shown within the dashed square in FIG. 2, can simply be inserted just in front of the AAA system of FIG. 4 or 5 so that the M inputs to the AAA system in the AAA-ALOD system or AF-AAA-ALOD system, X, are transformed exactly as shown by FIG. 2.

It is appreciated that the systems 400 or 500 can be configured such that it has more than three sub-systems, i.e., more than three auxiliary antenna elements, more than three FX processing blocks, and more than three weighting blocks.

It is appreciated by one skilled in the art that the various blocks described herein, namely, the master and slave processing blocks 502*a–d*, the ALOD processing block 412, the summation block 402, the AAA Weight Update Block 410, the AAA-AF Weight Update Block 510, and the weighting blocks 404, 406, and 408, as well as the entire system 400 or 500, may perform their respective functions by the execution of programmable instructions by one or more system or non-system processors. The programmable instructions could be stored on a storage medium, such as a compact disc or diskette. Alternately, the systems may be implemented in dedicated hardware in order to operate at higher speeds or to achieve a smaller or lower-power realization than can be accomplished with a general-purpose processor.

The storage medium is preferably a computer-readable medium on which is stored the programmable instructions (i.e., software) embodying any one, or all, of the methodologies described above. For the purposes of this specification, the term "computer-readable medium" shall be take to include any medium that is capable of storing or encoding a sequence of instructions for execution by the one or more system or non-system processors and that cause the one or more system or non-system processors to perform any one of the methodologies of the present invention. The term "computer-readable medium" shall accordingly be taken to include, but not limited to, solid-state memories, optical and magnetic disks, and carrier wave signals.

What has been described herein is merely illustrative of the application of the principles of the present invention. Other arrangements and methods may be implemented by those skilled in the art without departing from the scope and spirit of this invention.

What is claimed is:

1. A combined Adaptive Filtering, Adaptive Antenna Array and Adaptive Locally-Optimum Detection (AF-AAA-ALOD) system comprising:

a plurality of antenna elements, including a reference antenna element and a plurality of auxiliary antenna elements for receiving respective input signals;

a master AF processing block configured for receiving the input signal received by the reference antenna element and outputting an output signal and filter parameters;

a plurality of slave AF processing blocks each configured for receiving a corresponding input signal from the respective input signals and the filter parameters outputted by the master AF processing block and outputting an output signal;

a plurality of weighting blocks each configured for receiving a corresponding output signal outputted by a respective slave AF processing block of the plurality of slave AF processing blocks, multiplying the corresponding output signal using a respective weight from a plurality of weights to generate a weighted output signal, and outputting the weighted output signal;

a summation block configured for receiving the output signal outputted by the master AF processing block and the weighted output signals and outputting an output signal;

an ALOD processing block configured for receiving the output signal from the summation block and at least locally-optimum detection processing the received output signal to output a system output signal and at least one error feedback signal; and a weighting block configured for receiving the at least one error feedback signal and generating the plurality of weights.

2. The system according to claim 1, wherein the filter parameters indicate which input signals received by the plurality of slave AF processing blocks are to be frequency excised or attenuated.

3. The system according to claim 1, wherein the master AF processing block and each of the plurality of slave AF processing blocks include an Adaptive Wiener Filter (AWF).

4. The system according to claim 1, wherein the weighting block is further configured for receiving the output signal from the summation block.

5. A combined Adaptive Filtering, Adaptive Antenna Array and Adaptive Locally-Optimum Detection (AF-AAA-ALOD) system comprising:

means for receiving a plurality of input signals;

means for frequency excising or attenuating the plurality of input signals;

means for multiplying the excised or attenuated signals using weights;

means for summing the weighted signals;

means for locally-optimum detection processing the summed signals to provide a system output signal and an error feedback signal; and means for generating the weights using at least the error feedback signal.

6. The system according to claim 5, further comprising:

means for generating filter parameters indicating which input signals of the plurality of input signals are to be frequency excised or attenuated; and means for generating filter time delay weights indicating the time interval of the delay for the plurality of input signals by the means for frequency excising or attenuating.

7. The system according to claim 5, wherein the means for generating the weights further uses the summed signals outputted by the means for summing the weighted signals.

8. A method for processing a plurality of input signals received by a plurality of antenna elements, the method comprising the steps of:

frequency excising or attenuating the plurality of input signals;

multiplying the excised or attenuated signals using weights;

summing the weighted signals;

locally-optimum detection processing the summed signals to provide a system output signal and an error feedback signal; and generating the weights using at least the error feedback signal.

9. The method according to claim 8, further comprising:

generating filter parameters indicating which input signals of the plurality of input signals are to be frequency excised or attenuated; and generating filter time delay weights for indicating the time interval of the delay for the plurality of input signals by the means for frequency excising or attenuating.

10. The method according to claim 8, wherein the step of generating the weights further uses the summed signals.

11. A combined Adaptive Antenna Array-Adaptive Locally-Optimum Detection (AAA-ALOD) system comprising:

means for receiving a plurality of input signals;

means for multiplying the plurality of input signals using weights;

means for summing the weighted signals;

means for locally-optimum detection processing the summed signals to provide a system output signal and an error feedback signal; and means for generating the weights using at least the error feedback signal.

12. The system according to claim 11, wherein the means for generating further uses the summed signals.

13. A method for processing a plurality of input signals received by a plurality of antenna elements, the method comprising the steps of:

multiplying the plurality of input signals using weights;

summing the weighted signals;

locally-optimum detection processing the summed signals to provide a system output signal and an error feedback signal; and generating the weights using at least the error feedback signal.

14. The method according to claim 13, wherein the step of generating the weights further uses the summed signals.

15. A combined Adaptive Antenna Array-Adaptive Locally-Optimum Detection (AAA-ALOD) system comprising:

means for receiving an output from a AAA sub-system and an output from an ALOD sub-system, the AAA sub-system output being input to the ALOD sub-system; and means for updating weights of the AAA sub-system using the output from the AAA sub-system and the output from the ALOD sub-system.

16. The system according to claim 15, further comprising means for multiplying incoming signals to the AAA sub-system using the updated weights.

17. The system according to claim 16, further comprising means for summing the weighted signals to provide the AAA sub-system output.

18. The system according to claim 16, further comprising an Adaptive Filtering (AF) sub-system for providing the incoming signals to the AAA sub-system, wherein the AF sub-system includes a plurality of adaptive filtering processors each connected to a corresponding antenna element.

19. A computer-readable medium comprising instructions which when executed on at least one processor, cause the at least one processor to perform a method for processing a plurality of input signals received by a plurality of antenna elements, the method comprising the steps of:

frequency excising or attenuating the plurality of input signals;

multiplying the excised or attenuated signals using weights;

summing the weighted signals;

locally-optimum detection processing the summed signals to provide a system output signal and an error feedback signal; and generating the weights using the error feedback signal.

* * * * *